April 21, 1970  W. K. OWENS  3,507,048
BRAKE ADJUSTING GAGE
Filed March 21, 1968  2 Sheets-Sheet 1
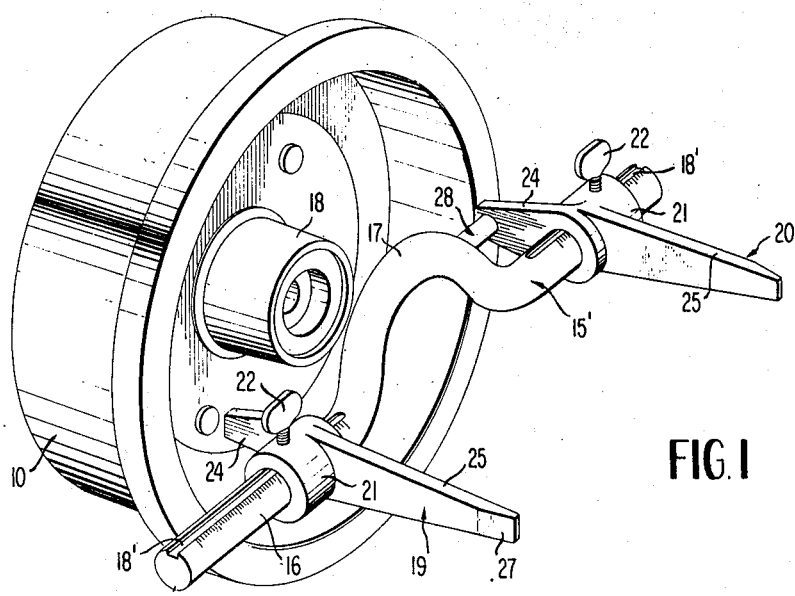
FIG. 1
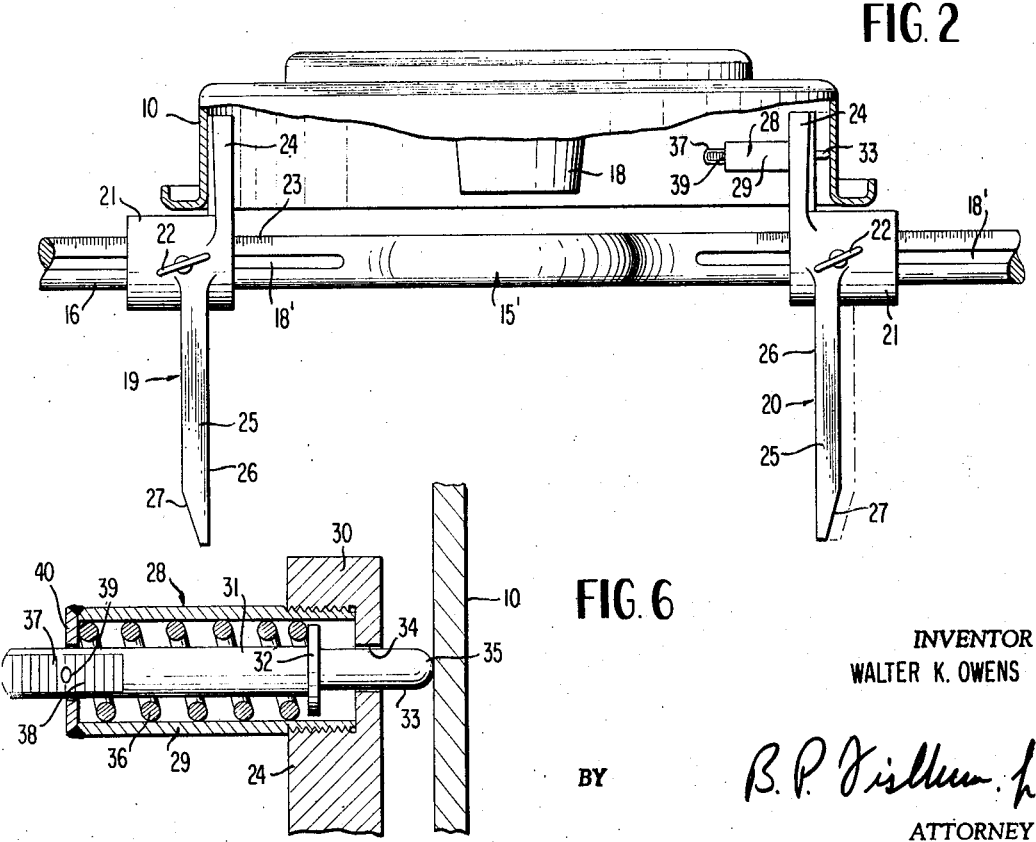
FIG. 2
FIG. 6
INVENTOR
WALTER K. OWENS
BY
ATTORNEY

INVENTOR
WALTER K. OWENS

BY

ATTORNEY

United States Patent Office 3,507,048
Patented Apr. 21, 1970

3,507,048
BRAKE ADJUSTING GAGE
Walter K. Owens, Pensacola, Fla., assignor to Souri, Inc., Pensacola, Fla., a corporation of Florida
Filed Mar. 21, 1968, Ser. No. 714,849
Int. Cl. E21b 47/08
U.S. Cl. 33—178    3 Claims

ABSTRACT OF THE DISCLOSURE

A highly simplified gage for use in adjusting and repairing automobile brakes and capable of accomplishing the work commonly requiring three separate gages or tools. The brake gage requires only one basic adjustment and is capable of establishing the proper clearance between brake shoes and drum, checking the drum for roundness and wear, and checking the condition of the wheel cylinder as to efficiency of operation and presence or absence of leaks.

Cross-reference to related application

This application is a continuation-in-part of my prior copending application Ser. No. 623,355, now abandoned, filed Mar. 15, 1967, for Brake Adjusting Gauge.

Background of the invention

A distinct need has existed in the art for some time for a single simple self-contained gage to be used by mechanics in the servicing and repair of automotive type brakes. Such work commonly requires a number of separate tools and gages to establish the necessary measurements and to determine the operating condition of vital parts such as the fluid-pressure operated wheel cylinders. For example, separate devices are usually employed to measure the internal diameter of the brake drum and the diameter across the brake shoes. The drum is checked for roundness and high spots with another type of gage and the checking of the wheel cylinder for leaks and for efficiency of operation is usually a rather haphazard or hit-and-miss procedure depending largely upon the experience and judgment of the mechanic.

The present invention provides a unitary, highly simplified gage or tool which enables the mechanic to accurately establish the proper brake shoe to drum clearance in all cases, the size of the drum and whether out of round or oversize, and the operating condition of the wheel cylinder and the presence or absence of leakage with the aid of the gage and without removing the same from the brake unit while making these observations. The invention gage is characterized by extreme simplicity, durability, extreme ease of adjustment, and reliability for use in connection with a wide variety of automotive type brakes.

Summary of the invention

The brake servicing gage of the invention includes a sturdy bar body portion carrying gaging units at the ends thereof, said units being adjustable lengthwise of the bar body portion and lockable in selected adjustable positions. Each gaging unit includes a pair of oppositely extending gage elements and corresponding elements of each unit are employed to measure and establish the drum diameter and the other corresponding elements of the gage units establish the proper clearance between shoes and drum without changing the adjustments of the gaging units on the bar body portion. One gaging unit carries an indicator device which is utilized in a preliminary operation to check the roundness of the drum and the presence or absence of high spots in the bore of the drum. The adjustable gage units are also capable of coacting with a part of the brake structure to enable pressure checking of the wheel cylinder for possible leaks while the drum is removed and with the gage mounted upon the brake assembly.

Brief description of the drawings

FIGURE 1 is a perspective view of a brake gage embodying the invention and depicting the same in relation to a brake drum forming part of a brake assembly;

FIGURE 2 is a plan view of the gage positioned relative to the drum for checking the roundness of the drum in a preliminary operation and then for establishing the diameter of the drum;

FIGURE 6 is an enlarged fragmentary vertical section through an indicator carried by one gaging unit.

Description of the preferred embodiment

Figure 3:
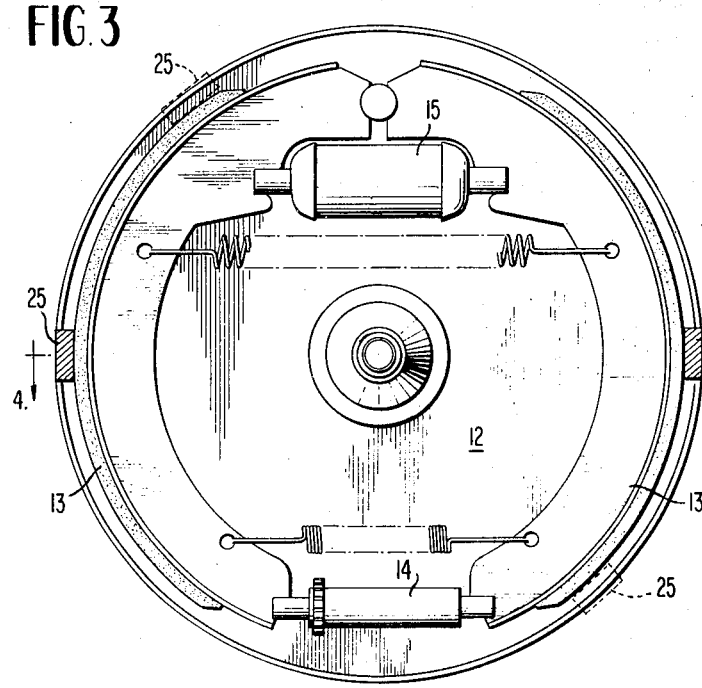
FIGURE 3 is a side elevational view of the brake mechanism including brake shoes, adjusting means and operating cylinder, and depicting the use of the gage for establishing the proper setting of the shoes.
Figure 4:
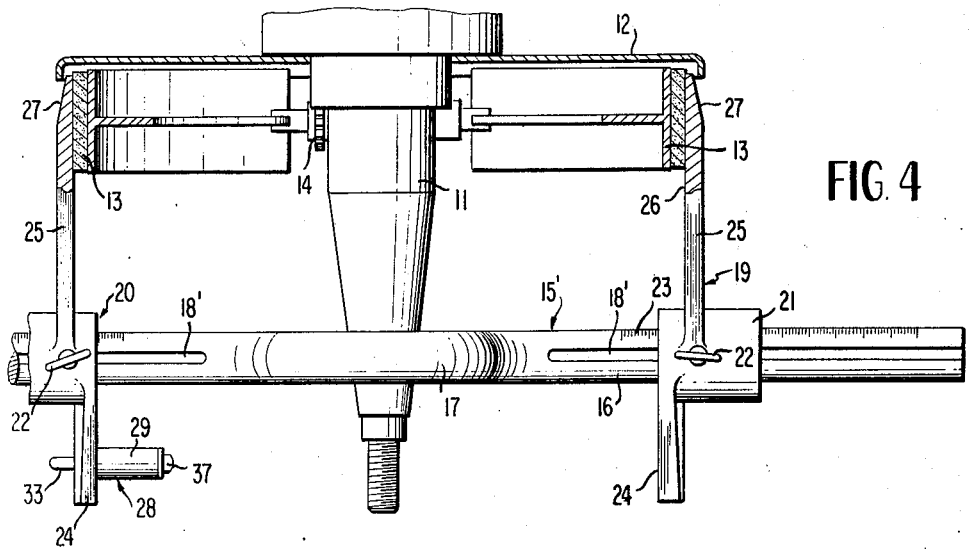
FIGURE 4 is a horizontal cross section taken on line 4—4 of FIGURE 3.

Referring to the drawings wherein like numerals designate like parts, the numeral 10 designates an automotive brake drum of conventional construction whose internal diameter is to be checked by the invention gage for size and roundness in a manner to be described. In the drawings, the drum 10 is shown removed from the remainder of the brake mechanism which remains attached to the axle structure indicated at 11. The conventional brake mechanism is illustrated in FIGURES 3 and 4 and includes a back plate or dust cover plate 12, opposed brake shoes 13, conventional brake shoe adjusting means 14, and hydraulic wheel cylinder 15 which controls the expansion of the two brake shoes against the interior of the brake drum during operation. The construction of the brake mechanism per se is conventional and need not be described in further detail herein for a proper understanding of the invention.

The brake servicing gage proper, forming the subject matter of the invention, is shown in its entirety at 15' and comprises a rigid bar body portion 16 of adquate length to span a wide range of sizes of automotive brake assemblies. The bar body portion 16 has a lateral loop 17 at its longitudinal center to clear the central hub 18 of the wheel structure carrying the drum and to also clear the axle 11 as in FIGURE 4.

The bar body portion 16 includes straight axially aligned end portions, as shown, each provided at a corresponding circumferential point with a longitudinal keyway or groove 18' suitably formed therein.

Longitudinally adjustably mounted on the opposite ends of the bar body portion 16 are gaging units 19 and 20, each including a tubular hub 21 which receives the adjacent straight end of the bar body portion slidably. Each hub 21 carries a locking thumb screw 22 having screw-threaded engagement with the hub and whose inner end engages within the adjacent groove 18' so as to prevent rotation of the unit 19 or 20 upon the bar body portion. When the thumb screws 22 are loosened, the gaging units 19 and 20 are easily slidable longitudinally upon the bar body portion to selected adjusted positions, where they may be securely locked in place by tightening of the thumb screws.

Adjacent to each groove or keyway 18', the straight ends of the bar body portion are preferably provided with measuring scales 23, preferably graduated in sixteenths of an inch or like small increments. The graduations of the scales 23 may align accurately with the inner end faces of the hubs 21, as shown.

Each gaging unit 19 and 20 comprises a first gage element or extension 24 which extends radially beyond one side of the hub 21 for entry into the drum 10 in a manner best shown in FIGURE 2. The outer side faces of the elements 24 are accurately surfaced and square with the longitudinal axis of the bar body portion, to facilitate the accurate gaging of the internal diameter of the drum 10, as will be further described.

Each gaging unit further comprises on the diametrically opposite side of its hub 21 a second and somewhat longer gaging element or extension 25 whose interior side face 26 is accurately surfaced and square with the axis of the bar body portion 16, so as to be properly engageable with the outer faces of the brake shoes 13, as shown in FIGURE 4. The gaging elements 25 are also beveled on their outer sides at their forward tips as indicated at 27, for a purpose to be described.

The drum gaging element 24 of one gaging unit, namely the unit 20 of the illustrated device, carries a drum roundness indicator assembly 28, shown in detail in FIGURE 6. The indicator assembly 28 comprises an external sleeve or housing 29 having screw-threaded engagement at 30 within a threaded opening of the element 24 and securely anchored therein. A gage pin 31 within the housing 29 has a shoulder flange 32 thereon which abuts the bottom face of the recess provided in the element 24. The pin 31 also includes a reduced diameter extension 33 projecting through an opening 34 in the gaging element 24 and having a rounded end 35 adapted to contact the interior surface of the drum 10, as shown.

A coil spring 36 within the housing 29 biases the pin 31 outwardly or toward the wall of the drum and normally maintains the flange 32 seated as shown in FIGURE 6. The opposite end of the indicator pin 31 is provided with at least one, and preferably a pair, of diametrically opposed flat surfaces 37, each of which has an indicator scale 38 thereon graduated in sixteenths of an inch and thirty-seconds of an inch, respectively, or in similar small increments. Preferably, the zero point 39 of the indicator scale 38 is approximately at the center thereof and when the indicator pin 31 is zeroed through contact of the extension 33 with the drum, the zero point 39 will be aligned with the outer face 40 of the end cover plate of housing 29.

Figure 5:
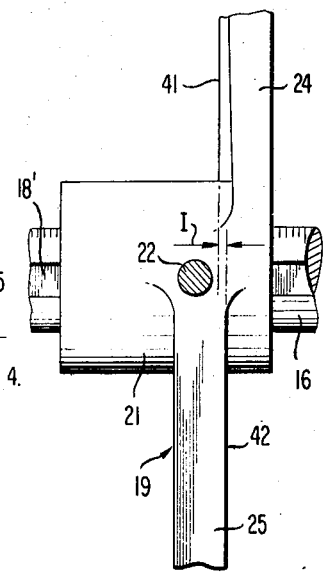
FIGURE 5 is an enlarged fragmentary elevation showing the relationship between the two gaging elements of each gaging unit of the device.

With reference to FIGURE 5, the fixed interference relationship between the radial gaging face 41 of gaging element 24 and the radial gaging face 42 of element 25 is shown. As previously mentioned, the gaging face 41 contacts the bore of the brake drum during the use of the gage, FIGURE 2, whereas the gaging face 42 contacts the exterior of a brake shoe as depicted in FIGURES 3 and 4. There is an overlapping or interference condition between the gaging faces 41 and 42 indicated by the letter I in FIGURE 5. This is a fixed and unchanging condition present in both gaging units 19 and 20. The distance I will usually be approximately 1/64 of an inch although in some cases may be slightly more or slightly less depending upon the manufacturing specifications for the gage. This fixed interference distance I is what establishes the correct clearance between the internal surface of the drum and the external faces of the brake shoes 13, as will be described.

Operation

The use or operation of the gage in servicing the brake assembly is as follows. As shown in FIGURE 1, the gaging units 19 and 20 are adjusted for entry into the drum 10 with the gaging element 24 of unit 19 contacting the drum firmly and the pin extension 33 also contacting the drum with the indicator 28 at the zero position as shown. If the indicator scale 38 at this time is 1/8 inch or more away from the zero point in either direction, the drum 10 may have been turned on a lathe previously or may be warped or out of round. These conditions may be checked readily by turning the entire gage 15' relative to the drum 10 and checking the indicator 28 at several different circumferential positions around the drum, preferably at least four or five different positions. An oversize or turned drum may be indicated by this procedure or warp or out of round drum, depending upon the circumstances. Reference to standard drum diameters is readily available. It may be established by this procedure if a new drum is required or if further turning of the drum is necessary to achieve roundness within the recommended limits of turning.

After completion of the drum diameter and roundness checking, with the gage 15' still centered within the drum, the gaging unit 20 is adjusted outwardly on the bar body portion until its gaging face firmly contacts the bore of the drum. The pin extension 33 will retract automatically and cause compression of the spring 36 at this time. Both drum gaging elements 24 will now be in firm contact with the drum at diametrically opposite points thereon. The two thumb screws 22 are now firmly locked or set so that the gaging units 19 and 20 are immovable.

The entire gage 15' is now removed from the drum and inverted to the position shown in FIGURE 4 so that the gaging elements 25 may be slipped over the brake shoes 13 to establish the proper adjustment thereof. The faces of the shoes should firmly engage the gaging faces of the elements 25 with zero clearance and the adjuster 14 is utilized at this time to set the positions of the brake shoes firmly against the gaging elements 25.

This simple adjustment of the brake shoes relative to the gaging elements 25 automatically establishes the precise required clearance between the shoes and the interior of the drum 10, this clearance being established by the fixed dimensional relationship or interference shown at I between the gaging faces 41 and 32 of the respective gaging units.

When the adjusting of the shoes 13 is completed in this manner, and prior to removing the gage 15' and placing the drum over the shoes, several other important checks may be made. The wheel cylinder 15 may be reliably checked for leaks in the following manner. The gage 15' is pushed inwardly toward the back-up plate 12 until its beveled faces 27 engage snugly within the marginal flange of this plate. This securely locks the gaging units 19 and 20 against separation and relieves the thumb screws 22 of some pressure. The brake pedal of the automobile is depressed and the gage will firmly resist expansion or separation of the shoes 13 since the elements 25 are interlocked with the plate 12. If a leak exists in the cylinder 15, it will show up under this pressure.

At this time, the entire gage 15' may be turned circumferentially upon the brake assembly to position the gaging elements 25 approximately as shown in dotted lines in FIGURE 3. The brake pedal may now be depressed again and the smooth or sluggish operation of the wheel cylinder may be visually observed. Also, at this time, it may be observed when the pedal is depressed whether there is equal or unequal expansion of the two shoes relative to the center of the cylinder 15. If the cylinder does not perform up to standard, in these respects, it will be replaced or rebuilt in the usual manner. The gage 15' may be returned to its original position shown in FIGURES 3 and 4 for a final checking or adjustment of the shoes 13 prior to removing the gage. When the gage is removed from the brake assembly, the drum is simply placed over the shoes 13 and the mechanic may be assured that the brakes are properly adjsuted in accordance with exacting standards and a safe and complete servicing of the brake mechanism has been rendered much simpler and faster than usual with the aid of the invention. Up to one-half hour may be saved in the performance of usual brake job and the invention gage accomplishes the work usually accomplished by three separate tools. The advantages of the invention and its utility should now be apparent to those skilled in the art without the necessity for any further description herein.

Regarding the diameter measuring scale 23 on the bar body portion 16, there is a unique coaction between this scale and the scale 38 of the indicator unit 28. For example, when the gaging units 19 and 20 are set as in FIGURE 2 to check a known standard size drum, such as an eight inch diameter drum, the interior faces of the hubs 21 are adjusted on the bar body portion to align with eight inch diameter graduations on the scale 23. If the drum is properly sized, the indicator scale 38 will be zeroed as illustrated in FIGURES 2 and 6, that is, the zero point 39 will be aligned with the end face 40, FIGURE 6. If the drum is over-size or under-size, the degree of departure from the eight inch standard is measured on the scale 38.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A brake servicing gage comprising a bar body portion adapted to span an automotive brake drum diametrically, said body portion having longitudinal keyway grooves formed therein adjacent its opposite ends and having graduated distance measuring scales adjacent to and extending along said grooves, a companion pair of gage units on the bar body portion including hubs having bores slidably receiving said end portions, set screws on the hubs engaging within the keyway grooves and enabling the gage units to be releasably locked in selected adjusted positions on the bar body portion, a first pair of radially extending gage arms on the hubs near corresponding ends of the hubs and adapted to project into a brake drum to gage the internal diameter thereof, a spring-loaded indicator pin unit on one of said gage arms substantially at right angles thereto and parallel to the axes of the hubs, the indicator pin of the unit adapted to slidably contact the internal diameter face of the brake drum to gage the roundness thereof, the indicator pin unit having a graduated indicator scale separate from said distance measuring scales, the indicator pin being retractable so that both said gage arms may contact the interior surface of the brake drum, and a second pair of gage arms carried by the hubs and extending radially thereof in diametrically opposed relation to the first pair of gage arms in laterally offset relation thereto, there being a fixed interference relationship between the two gage arms of each gage unit indicative of proper brake shoe to drum clearance, said second pair of gage arms being substantially longer than the first pair and adapted to engage over the exterior of opposed brake shoes and having tapered tips adapted to enter the clearance space between the shoes and the back-up plate of the brake assembly.

2. The structure of claim 1, and the bar body portion having an offeset loop near its longitudinal center to provide clerance with the hub of the wheel structure carrying the brake drum.

3. The structure of claim 1, and the indicator scale on said pin having a central zero point and being graduated in opposite directions from the zero point, and a housing for the indicator pin and its spring including an end wall at right angles to the pin forming a reading line for the scale of the indicator pin on either side of the zero point.

References Cited

UNITED STATES PATENTS

| | | |
|---|---|---|
| 1,007,400 | 10/1911 | Speer. |
| 2,018,550 | 10/1935 | Freeman et al. |
| 2,083,944 | 6/1937 | Cottrell. |
| 2,822,621 | 2/1958 | Barrett. |
| 3,006,076 | 10/1961 | Wisti. |
| 3,139,685 | 7/1964 | Wasley. |
| 3,277,905 | 10/1966 | Thompson. |

WILLIAM D. MARTIN, Jr., Primary Examiner

U.S. Cl. X.R.

33—143, 147